United States Patent
Lhost et al.

(10) Patent No.: US 10,450,490 B2
(45) Date of Patent: Oct. 22, 2019

(54) THERMAL SWITCH BASED ON POLYMER COMPOUND

(71) Applicant: Total Research & Technology Feluy, Seneffe (Feluy) (BE)

(72) Inventors: Olivier Lhost, Havre (BE); Dimitri Rousseaux, Nivelles (BE)

(73) Assignee: TOTAL RESEARCH & TECHNOLOGY FELUY, Seneffe (BE)

(*) Notice: Subject to any disclaimer, the term of this patent is extended or adjusted under 35 U.S.C. 154(b) by 60 days.

(21) Appl. No.: 15/557,420

(22) PCT Filed: Mar. 11, 2016

(86) PCT No.: PCT/EP2016/055376
§ 371 (c)(1),
(2) Date: Sep. 11, 2017

(87) PCT Pub. No.: WO2016/142543
PCT Pub. Date: Sep. 15, 2016

(65) Prior Publication Data
US 2018/0273822 A1    Sep. 27, 2018

(30) Foreign Application Priority Data

Mar. 12, 2015  (EP) .................................. 15158854

(51) Int. Cl.
*H01B 1/24* (2006.01)
*C09K 5/14* (2006.01)
(Continued)

(52) U.S. Cl.
CPC .............. *C09K 5/14* (2013.01); *B29C 48/022* (2019.02); *B29C 48/78* (2019.02); *C08J 3/226* (2013.01); *C08K 3/04* (2013.01); *C08K 3/041* (2017.05); *C08L 23/06* (2013.01); *C08L 25/06* (2013.01); *H01B 1/24* (2013.01); *H01C 7/008* (2013.01); *H01C 7/027* (2013.01); *H01C 17/00* (2013.01); *H01C 17/0652* (2013.01); *H01C 17/06586* (2013.01); *B29C 67/24* (2013.01); *B29K 2023/06* (2013.01); *B29K 2025/06* (2013.01); *B29K 2105/0094* (2013.01); *B29K 2105/162* (2013.01); *B29K 2507/04* (2013.01); *B29K 2995/004* (2013.01); *B29K 2995/0005* (2013.01); *B29K 2995/0039* (2013.01); *B82Y 30/00* (2013.01); *B82Y 40/00* (2013.01); *C08J 2323/06* (2013.01); *C08J 2325/04* (2013.01); *C08J 2325/06* (2013.01); *C08J 2423/06* (2013.01); *C08J 2425/06* (2013.01); *C08K 3/046* (2017.05); *C08K 2201/001* (2013.01); *C08K 2201/011* (2013.01); *C08L 2203/20* (2013.01); *C08L 2205/025* (2013.01); *C08L 2310/00* (2013.01); *Y10S 977/752* (2013.01); *Y10S 977/753* (2013.01); *Y10S 977/842* (2013.01); *Y10S 977/955* (2013.01)

(58) Field of Classification Search
CPC ..... B29C 47/0004; B29C 47/78; B29C 67/24; B29K 2023/06; B29K 2025/06; B29K 2105/0094; B29K 2105/162; B29K 2507/04; B29K 2995/0005; B29K 2995/0039; B29K 2995/004; B82Y 30/00; B82Y 40/00; C08J 2323/06; C08J 2325/04; C08J 2325/06; C08J 2423/06; C08J 2425/06; C08J 3/226; C08K 2201/001; C08K 2201/011; C08K 3/04; C08K 3/041; C08K 3/046; C08L 2203/20; C08L 2205/025; C08L 2310/00; C08L 23/06; C08L 25/06; C09K 5/14; H01B 1/24; H01C 17/00; H01C 17/0652; H01C 17/06586; H01C 7/008; H01C 7/027; Y10S 977/752; Y10S 977/753; Y10S 977/842; Y10S 977/955
See application file for complete search history.

(56) References Cited

U.S. PATENT DOCUMENTS

| | | |
|---|---|---|
| 6,197,220 B1 | 3/2001 | Blok et al. |
| 2003/0107466 A1 | 6/2003 | Lin |
| 2010/0255353 A1 | 10/2010 | McDonald et al. |

FOREIGN PATENT DOCUMENTS

| | | | |
|---|---|---|---|
| CN | 1687208 A | 10/2005 | |
| CN | 104497394 A | * 4/2015 | ............. C08L 23/06 |

(Continued)

OTHER PUBLICATIONS

Rahaman, M. et al., "Control of the temperature coefficient of the DC resistivity in polymer-based composites," J Mater Sci (2013) 48:7466-7475 (Year: 2013).*

(Continued)

*Primary Examiner* — Mark Kopec
*Assistant Examiner* — Jaison P Thomas
(74) *Attorney, Agent, or Firm* — Albert Shung

(57) ABSTRACT

The present invention relates to an article suitable to act as a thermal switch device, the article having a surface resistance of more than $10^5$ ohms and formed from a polymer composition comprising from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material, wherein the surface resistance of the article is divided by at least 10, preferably by at least 100, when said article is submitted for a determined period of time of less than 5 minutes to a temperature of switch i) ranging from Tg+10° C. to Tg+250° C. if the polymer composition comprises an amorphous polymer, or ii) ranging from Tm−80° C. to Tm+250° C. if the polymer composition comprises a semi-crystalline polymer.

13 Claims, No Drawings

| (51) | Int. Cl. | |
|---|---|---|
| | *C08J 3/22* | (2006.01) |
| | *C08K 3/04* | (2006.01) |
| | *H01C 7/02* | (2006.01) |
| | *H01C 17/065* | (2006.01) |
| | *C08L 23/06* | (2006.01) |
| | *C08L 25/06* | (2006.01) |
| | *H01C 7/00* | (2006.01) |
| | *H01C 17/00* | (2006.01) |
| | *B29C 48/00* | (2019.01) |
| | *B29C 48/78* | (2019.01) |
| | *B29C 67/24* | (2006.01) |
| | *B29K 25/00* | (2006.01) |
| | *B29K 105/00* | (2006.01) |
| | *B29K 105/16* | (2006.01) |
| | *B29K 507/04* | (2006.01) |
| | *B82Y 30/00* | (2011.01) |
| | *B82Y 40/00* | (2011.01) |

(56) References Cited

FOREIGN PATENT DOCUMENTS

| WO | 2004070566 A2 | 8/2004 |
|---|---|---|
| WO | 2006057797 A2 | 6/2006 |

OTHER PUBLICATIONS

Search Report and Written Opinion for Singapore Application No. 11201706905Q, dated Oct. 5, 2018, 9 pages.
International Search Report issued in PCT/EP2016/055376, dated May 4, 2016, 3 pages.
Plastics Additives Handbook, ed. H. Zweifel, 5th edition, 2001, Hanser Publishers.

* cited by examiner

THERMAL SWITCH BASED ON POLYMER COMPOUND

CROSS-REFERENCE TO RELATED APPLICATIONS

This application claims the benefit of PCT/EP2016/055376 filed Mar. 11, 2016, which claims priority from EP 15158854.8 filed Mar. 12, 2015, which are incorporated herein by reference in their entireties for all purposes.

FIELD OF THE INVENTION

The present invention relates to articles suitable to act as a thermal switch device and their process of production. The present invention also relates to the use of a conductive or at least dissipative polymer composition in a thermal switch device.

BACKGROUND OF THE INVENTION

In several apparatus, such as electronic devices or transformation machine, there is a need to introduce a thermal switch device able to detect that a high temperature is reached and, in such conditions, able to send a message to interrupt the power or to switch on an alarm. The message sent can be of the electrical form.

With this purpose in mind, it is known to use a thermoresponsive polymer into such an apparatus. For example, WO2006057797 discloses a thermoresponsive polymer that is in an expanded volume state at ambient temperature and in a contracted volume state at a defined higher temperature. A switch is constructed using such polymer, allowing two connectors to be in contact with each other at said defined temperature. However, the switch incorporates therefore mobile elements It is also known from EP1587636 to use a conductive organic polymer layer in contact with, and lying between, two conductors. In a first state, the organic polymer layer conducts current between the two conductors with relatively high conductivity, and in a second state, the organic polymer layer conducts current between the two conductors with relatively low conductivity. However, the change of conductivity of the organic polymer layer is the result of a high voltage pulse passed between the two conductors.

Thus, it is an object of the invention to provide an article suitable to act as thermal switch able to detect that a high temperature is reached and to send a message accordingly, as well as a process to produce such article. It is also an object of the invention to provide such an article suitable to act as a thermal switch without the need of a complex structure incorporating mobile elements. It is also an object of the invention to provide an article suitable to act as thermal switch allowing the production of flexible devices. It is a further object of the invention to provide an article suitable to act as thermal switch with low production costs. Finally, it is an object of the invention to provide an article suitable to act as thermal switch being strongly reliable.

SUMMARY ON THE INVENTION

According to a first aspect, the invention provides an article suitable to act as a thermal switch device, the article having a surface resistance of more than $10^5$ ohms as determined according to ASTM D257-07, and being formed from a polymer composition, said polymer composition comprising from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material;

wherein the surface resistance of the article is divided by at least 10, preferably by at least 100, when said article is submitted for a determined period of time of less than 5 minutes to a temperature of switch i) ranging from Tg+10° C. to Tg+250° C. if the polymer composition comprises an amorphous polymer, or ii) ranging from Tm−80° C. to Tm+250° C. if the polymer composition comprises a semi-crystalline polymer.

According to a second aspect, the invention provides a process to produce an article suitable to act as a thermal switch device as defined above, comprising the step of:

a) providing a polymer composition having a surface resistance less than $10^4$ ohms as determined according to ASTM D257-07, said polymer composition comprising:

from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material;

b) forming or pre-forming an article; and c) cooling the article by contact with a cooling device system or medium using a temperature of at least Tg−20° C. if the polymer composition comprises an amorphous polymer or at least Tm−20° C. if the polymer composition comprises a semi-crystalline polymer.

According to a third aspect, the invention also encompasses the use of a polymer composition having a surface resistance less than $10^4$ ohms as determined according to ASTM D257-07 to produce the article as defined above, preferably in the above process.

According to a fourth aspect, the invention provides a thermally conductive article (meaning that the thermal conductivity is higher than 0.4 W/(m*K)) electrically conducting or insulating, the electrical conductivity being switched as above-described.

DETAILED DESCRIPTION OF THE INVENTION

In the following passages, different aspects of the invention are defined in more detail. Each aspect so defined may be combined with any other aspect or aspects unless clearly indicated to the contrary. In particular, any embodiment indicated as being preferred or advantageous may be combined with any other embodiment or embodiments indicated as being preferred or advantageous.

A—The Article

The article suitable to act as a thermal switch device, according to the present invention, has a surface resistance of at least $10^5$ ohms as determined according to ASTM D257-07 and is formed from a polymer composition comprising:

from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material;

wherein the surface resistance of the article is divided by at least 10, preferably by at least 100, when said article is submitted for a determined period of time of less than 5 minutes to a temperature of switch i) ranging from Tg+10° C. to Tg+250° C. if the polymer composition comprises an amorphous polymer, or ii) ranging from Tm−80° C. to Tm+250° C. if the polymer composition comprises a semi-crystalline polymer.

In an embodiment, the article suitable to act as a thermal switch device, according to the present invention, has a surface resistance of at least $10^5$ ohms as determined according to ASTM D257-07 and is formed from a polymer composition comprising:

from 50 to 99.9 wt % relative to the total weight of the polymer composition, of a polymer being an amorphous polymer having a glass transition temperature Tg, and from 0.1 to 50 wt % relative to the total weight of the polymer composition, of a conductive material;

wherein the surface resistance of the article is divided by at least 10, preferably by at least 100, when said article is submitted for a determined period of time of less than 5 minutes to a temperature of switch ranging from Tg+10° C. to Tg+250° C.

In another embodiment, the article suitable to act as a thermal switch device, according to the present invention, has a surface resistance of at least $10^5$ ohms as determined according to ASTM D257-07 and is formed from a polymer composition comprising:

from 50 to 99.9 wt % relative to the total weight of the polymer composition, of a polymer being a semi-crystalline polymer having a melting temperature Tm, and from 0.1 to 50 wt % relative to the total weight of the polymer composition, of a conductive material;

wherein the surface resistance of the article is divided by at least 10, preferably by at least 100, when said article is submitted for a determined period of time of less than 5 minutes to a temperature of switch ranging from Tm−80° C. to Tm+250° C.

In another embodiment, the article suitable to act as a thermal switch device, according to the present invention, has a surface resistance of at least $10^5$ ohms as determined according to ASTM D257-07 and is formed from a polymer composition comprising:

from 50 to 99.9 wt % relative to the total weight of the polymer composition, of a polymer being a mixture of an amorphous polymer having a glass transition temperature Tg and a semi-crystalline polymer having a melting temperature Tm, and from 0.1 to 50 wt % relative to the total weight of the polymer composition, of a conductive material;

wherein the composition comprises two immiscible phases being an amorphous polymer phase and a semi-crystalline polymer, one of the amorphous polymer phase or the semi-crystalline polymer phase forming a continuous polymeric phase in the polymer composition, the surface resistance of the article is divided by at least 10, preferably by at least 100, when said article is submitted for a determined period of time of less than 5 minutes to a temperature of switch i) ranging from Tg+10° C. to Tg+250° C. if the polymer composition comprises an amorphous polymer forming the continuous polymeric phase, or ii) ranging from Tm−80° C. to Tm+250° C. if the polymer composition comprises a semi-crystalline polymer forming the continuous polymeric phase.

In another embodiment, the article suitable to act as a thermal switch device, according to the present invention, has a surface resistance of at least $10^5$ ohms as determined according to ASTM D257-07 and is formed from a polymer composition comprising:

from 50 to 99.9 wt % relative to the total weight of the polymer composition, of a polymer being a mixture of an amorphous polymer having a glass transition temperature Tg and a semi-crystalline polymer having a melting temperature Tm, and from 0.1 to 50 wt % relative to the total weight of the polymer composition, of a conductive material;

wherein the composition comprises two immiscible phases being an amorphous polymer phase and a semi-crystalline polymer, and both being continuous polymeric phase in the polymer composition, the surface resistance of the article is divided by at least 10, preferably by at least 100, when said article is submitted for a determined period of time of less than 5 minutes to a temperature of switch i) ranging from Tg+10° C. to Tg+250° C. if the polymer composition comprises an amorphous polymer phase having a content of conductive material highest than the semi-crystalline polymer phase, or ii) ranging from Tm−80° C. to Tm+250° C. if the polymer composition comprises a semi-crystalline polymer phase having a content of conductive material highest than the amorphous polymer phase.

In another embodiment, the article has a thermal conductivity higher than 0.4 W/(m*K). The article according to the present invention may be electrically conductive or insulating. The thermal conductivity is a function of the content of CNT in the composition. If the thermal conductivity of the article produced is too low, the person skilled in the art can increase the content of CNT in the composition to raise the thermal conductivity of the article produced thereof.

In some embodiments, the polymer composition comprises an amorphous polymer. The term "amorphous polymer" indicates a polymer that, because of its constitution, is unable to crystallize, i.e., a polymer that is not a crystallizable polymer or to a crystallizable polymer device but produced with a too fast crystallization rate. The glass transition temperature is the reversible transition in amorphous materials from a hard and relatively brittle state into a molten or rubber-like state. The glass transition temperature of an amorphous polymer can be determined according to ISO 11357-2:2013.

The amorphous polymer considered by the invention is selected from polystyrene (PS), atactic polypropylene (aPP), acrylonitrile-butadiene-styrene (ABS), polycarbonate (PC), styrene acrylonitrile (SAN), poly(methyl methacrylate) (PMMA), poly(vinyl chloride) (PVC), polybutadiene (PBu), polybutylene terephthalate (PBt), poly(p-phenylene oxide) (PPO), polysulfone (PSU), polyethersulfone (PES), polyethylenimine (PEI), polyphenylsulfone (PPSU), acrylonitrile styrene acrylate (ASA) or any combination thereof.

In a preferred embodiment, the amorphous polymer is polystyrene, modified polystyrene or a mixture of polystyrene and modified polystyrene, with preference the amorphous polymer is polystyrene, for example general-purpose polystyrene (GPPS).

When a combination of amorphous polymers of different Tg is considered, the person skilled in the art will determined the Tg to be taken into consideration with respect to the determination of the temperature of switch according to the following:
in case of two immiscible polymers, Tg refers to the value of Tg of the polymer of the continuous phase;
in case of co-continuity of the phases, the phase containing the highest conductive material has to be considered to determine the Tg to be considered;
in case of a mixture of miscible polymers, Tg of the final mixture has to be considered.

In case of co-continuity of the phases, the phase containing the highest conductive material may be determined via scanning electron microscopy (SEM).

In some embodiments, the polymer composition comprises a semi-crystalline polymer. The term "semi-crystalline polymer" indicates a polymer in which some fraction remains un-crystallized, or, amorphous when the polymer is cooled to room temperature. In accordance with the invention, a semi-crystalline polymer is a polymer having a degree of crystallinity above 5%, preferably above 10%, as determined according to ASTM D3418-12. The melting temperature of a semi-crystalline polymer can be determined according to ISO 11357-3:2013.

The semi-crystalline polymer considered by the invention is selected from polyamide, homo- and co-polymer of ethylene (PE), homo- and co-polymer of propylene (PP), impact copolymer of propylene (IPP), Polylactide (PLA), polyether ether ketone (PEEK), polyoxymethylene (POM), syndiotactic polystyrene (sPS), polyphenylene sulfide (PPS), liquid crystalline polymers (LCP), homo- and co-polymer of butane, homo- and co-polymer of hexene, ethylene vinyl acetate (EVA), polyurethane or any combination thereof.

Preferably the semi-crystalline polymer is selected from homo- and co-polymer of ethylene (PE), homo- and co-polymer of propylene (PP), impact copolymer of propylene (IPP), Polylactide (PLA), or any combination thereof. More preferably, the homo- and co-polymer of ethylene (PE), homo- and co-polymer of propylene (PP), impact copolymer of propylene (IPP) or any combination thereof. In all embodiments the polypropylene considered (being homopolymer or copolymer of propylene) is syndiotactic polypropylene or isotactic polypropylene.

When a combination of semi-crystalline polymers of different Tm is considered, the person skilled in the art will determined the Tm to be taken into consideration with respect to the determination of the temperature of switch according to the following:
in case of two immiscible polymers, Tm refers to the value of Tm of the polymer of the continuous phase;
in case of co-continuity of the phases, the phase containing the highest conductive material has to be considered to determine the Tm to be considered;
in case of a mixture of miscible polymers, Tm of the final mixture has to be considered.

In case of co-continuity of the phases, the phase containing the highest conductive material may be determined via scanning electron microscopy (SEM).

In all embodiments where two immiscible polymers are considered (being either in co-continuous phase or in dispersed phase), transmission electron microscopy can be used regarding composition comprising two immiscible phases. For the observation by transmission electron microscopy of heterophasic polymer, it is necessary to enhance contrast of the phases present in polymer with a staining method. For this, a strong oxidizing agent (e.g., ruthenium tetroxide or osmium tetroxide) is used. It will come to "fix" a preferentially on one of the phases. The choice of oxidant depends on the type of polymer to be observed. In the case where two immiscible polymers which form co-continuous phases of both contain carbon nanotubes, the person skilled in the art would observe the sample in 2 stages. Consider a polymer with two phases A and B, the sample is treated to contrast only phase A and the dispersion of carbon nanotubes is observed in Phase B. After, the inverse formulation is performed. Only phase B is contrasted and the dispersion of carbon nanotubes is observed in Phase A. With this method, it can be seen the dispersion of carbon nanotubes in each phase presents in the polymer. Details of this type of preparation are included in all the works of microscopy like Polymer Microscopy (Linda C. Sawyer & David T. Gribb—Edition: Chapman and Hall).

In all embodiments, the polymer composition preferably comprises at least 60 wt %, preferably at least 70 wt %, more preferably at least 75 wt %, more preferably at least 85 wt %, even more preferably at least 90 wt %, most preferably at least 95 wt % relative to the total weight of the polymer composition, of a polymer being selected from an amorphous polymer, a semi-crystalline polymer or a mixture thereof.

In all embodiments, the polymer composition preferably comprises at most 99.5 wt %, more preferably at most 99.0 wt %, even more preferably at most 98.5 wt % and most preferably 98.0 wt % relative to the total weight of the polymer composition, of a polymer being selected from an amorphous polymer, a semi-crystalline polymer or a mixture thereof.

In an embodiment of the invention the polymer of the polymer composition is a mixture of amorphous and/or semi-crystalline polymers. The person skilled in the art may determine via known methods, such as scanning electron microscopy (SEM), which of the polymer between the amorphous polymer and the semi-crystalline polymer forms the continuous polymeric phase of the polymer composition, and select the temperature of switch as being:
i) ranging from Tg+10° C. to Tg+250° C. if the polymer composition comprises an amorphous polymer forming the continuous polymeric phase, or
ii) ranging from Tm−80° C. to Tm+250° C. if the polymer composition comprises a semi-crystalline polymer forming the continuous polymeric phase.

In case of two immiscible polymers, Tg or Tm refers to the value of Tg or Tm of the polymer of the continuous phase. In case of co-continuity of the phases, the phase containing the highest conductive material has to be considered to determine the Tg and Tm to be considered. In case of a mixture of miscible polymers (like e.g. polypropylene-polybutene blends), Tm or Tg of the final mixture has to be considered.

In case of co-continuity of the phases, the phase containing the highest conductive material may be determined via scanning electron microscopy (SEM).

In the context of the invention, the wording "the polymer composition comprises an amorphous polymer" encompasses embodiments where the polymer composition comprises a mixture of polymers wherein an amorphous polymer forming the continuous polymeric phase. In a similar way, the wording "the polymer composition comprises a semi-crystalline polymer" encompasses embodiments where the polymer composition comprises a mixture of polymers wherein a semi-crystalline polymer forms the continuous polymeric phase.

In all embodiments, the conductive material of the polymer composition is carbonaceous or metallic material. In a preferred embodiment, the conductive material of the polymer composition is nanoparticles. The nanoparticles used in the present invention can generally be characterized by having a size from 1 to and 5 µm. In the case of, for example, nanotubes, this definition of size can be limited to two dimensions only, i.e. the third dimension may be outside of these limits. Preferably, the nanoparticles are selected from the group comprising: carbon nanoparticles, silicon nanoparticles, SiC nanoparticles, metal fibers, or metal powders. In an embodiment, the nanoparticles are selected from the group comprising nanotubes, nanofibers, carbon black, nanographene, nanographite, and blends thereof. In an embodiment, the nanoparticles are selected from the group comprising carbon-, silicon- or SiC-nanotubes, -nanofibers, -nanographene, -nanographite, carbon black, and blends thereof. Preferably, the nanoparticles are selected from the group comprising carbon nanotubes, carbon nanofibers, carbon black, and blends thereof. More preferred are carbon nanotubes, carbon nanofibers, and blends of these. Most preferred are carbon nanotubes.

Suitable carbon nanotubes used in the present invention can generally be characterized by having a size from 1 nm to 5 µm, this definition of size can be limited to two dimensions only, i.e. the third dimension may be outside of these limits.

Suitable carbon nanotubes also referred to as "nanotubes" herein, can be cylindrical in shape and structurally related to fullerenes, an example of which is Buckminster fullerene ($C_{60}$). Suitable carbon nanotubes may be open or capped at their ends. The end cap may for example be a Buckminster-type fullerene hemisphere. Suitable carbon nanotubes used in the present invention can comprise more than 90%, more preferably more than 95%, even more preferably more than 99% and most preferably more than 99.9% of their total weight in carbon. However, minor amounts of other atoms may also be present.

Suitable carbon nanotubes to be used in the present invention can be prepared by any method known in the art. They can be prepared by the catalyst decomposition of hydrocarbons, a technique that is called Catalytic Carbon Vapor Deposition (CCVD). Other methods for preparing carbon nanotubes include the arc-discharge method, the plasma decomposition of hydrocarbons or the pyrolysis of selected polyolefin under selected oxidative conditions. The starting hydrocarbons can be acetylene, ethylene, butane, propane, ethane, methane or any other gaseous or volatile carbon-containing compound. The catalyst, if present, is used in either pure or in supported form. The presence of a support greatly improves the selectivity of the catalysts but it contaminates the carbon nanotubes with support particles, in addition to the soot and amorphous carbon prepared during pyrolysis. Purification can remove these by-products and impurities. This can be carried out according to the following two steps:
1) the dissolution of the support particles, typically carried out with an appropriate agent that depends upon the nature of the support and
2) the removal of the pyrolytic carbon component, typically based on either oxidation or reduction processes.

Carbon nanotubes can exist as single-walled nanotubes (SWNT) and multi-walled nanotubes (MWNT), i.e. carbon nanotubes having one single wall and nanotubes having more than one wall, respectively. In single-walled carbon nanotubes a one atom thick sheet of atoms, for example a one atom thick sheet of graphite (also called graphene), is rolled seamlessly to form a cylinder. Multi-walled carbon nanotubes consist of a number of such cylinders arranged concentrically. The arrangement, in multi-walled carbon nanotubes, can be described by the so-called Russian doll model, wherein a larger doll opens to reveal a smaller doll.

In an embodiment, the carbon nanotubes are multi-walled carbon nanotubes, more preferably multi-walled carbon nanotubes having on average from 5 to 15 walls.

Carbon nanotubes, irrespectively of whether they are single-walled or multi-walled, may be characterized by their outer diameter or by their length or by both.

Single-walled carbon nanotubes are preferably characterized by an outer diameter of at least 0.5 nm, more preferably of at least 1 nm, and most preferably of at least 2 nm. Preferably their outer diameter is at most 50 nm, more preferably at most 30 nm and most preferably at most 10 nm. Preferably, the length of single-walled nanotubes is at least 0.1 µm, more preferably at least 1 µm, even more preferably at least 10 µm. Preferably, their length is at most 50 µm, more preferably at most 25 µm.

Multi-walled carbon nanotubes are preferably characterized by an outer diameter of at least 1 nm, more preferably of at least 2 nm, 4 nm, 6 nm or 8 nm, and most preferably of at least 9 nm. The preferred outer diameter is at most 100 nm, more preferably at most 80 nm, 60 nm or 40 nm, and most preferably at most 20 nm. Most preferably, the outer diameter is in the range from 10 nm to 20 nm. The preferred length of the multi-walled nanotubes is at least 50 nm, more preferably at least 75 nm, and most preferably at least 100 nm. In an embodiment, the multi-walled carbon nanotubes have an average outer diameter in the range from 10 nm to 20 nm or an average length in the range from 100 nm to 10 µm or both. In an embodiment the average L/D ratio (length/diameter ratio) is at least 5, preferably at least 10, preferably at least 25, preferably at least 50, preferably at least 100, and more preferably higher than 100.

Preferred carbon nanotubes are carbon nanotubes having a surface area of 200-400 $m^2/g$ (measured by Brunauer-Emmett-Teller (BET) method).

Preferred carbon nanotubes are carbon nanotubes having a mean number of 5-15 walls.

Non-limiting examples of commercially available multi-walled carbon nanotubes are Graphistrength™ 100, available from Arkema, Nanocyl™ NC 7000 available from Nanocyl, FloTube™ 9000 available from CNano Technology.

In all embodiments, the polymer composition preferably comprises at least 0.2 wt %, more preferably at least 0.3 wt %, even more preferably at least 0.4 wt %, most preferably at least 0.5 wt % relative to the total weight of the polymer composition, of a conductive material. Preferably, the conductive material is carbon nanotubes.

In all embodiments, the polymer composition preferably comprises at most 20 wt %, more preferably at most 10 wt %, even more preferably at most 8 wt % and most preferably 4 wt % relative to the total weight of the polymer composition, of a conductive material. Preferably, the conductive material is carbon nanotubes.

In all embodiments of the invention, the polymer composition comprises one or more additives selected from the group comprising an antioxidant, an antiacid, a UV-absorber, an antistatic agent, a light stabilizing agent, an acid scavenger, a lubricant, a nucleating/clarifying agent, a colorant or a peroxide. An overview of suitable additives may be found in Plastics Additives Handbook, ed. H. Zweifel, 5th edition, 2001, Hanser Publishers, which is hereby incorporated by reference in its entirety.

In all embodiments of the invention, the polymer composition comprises from 0% to 50% by weight of one or more filler selected from the group consisting of: talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, natural fibers, glass fibers and combinations thereof. With preference the inorganic filler is talc.

The invention also encompasses the article as described herein wherein the polymer composition comprises from 0% to 10% by weight of at least one additive such as antioxidant, based on the total weight of the polymer composition. In a preferred embodiment, said polymer composition comprises less than 5% by weight of additive, based on the total weight of the polymer composition, for example from 0.1 to 3% by weight of additive, based on the total weight of the polymer composition.

In an embodiment, the polymer composition comprises an antioxidant. Suitable antioxidants include, for example, phenolic antioxidants such as pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), 3DL-alpha-tocopherol, 2,6-di-tert-butyl-4-methylphenol, dibutylhydroxyphenyl-propionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide,N,N'-1,6-hexanediyl bis[3,5-bis(1,1-dimethylethyl)-4-hydroxy] (Antioxidant 1098), Diethyl 3,5-Di-Tert-Butyl-4-Hydroxy-benzyl Phosphonate, Calcium bis[monoethyl(3,5-di-tert-butyl-4-hydroxylbenzyl)phosphonate], Triethylene glycol bis (3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro [5.5]undecane, 1,3,5-trimethyl-2,4,6-tris(3,5-di-tert-butyl-4-hydroxybenzypenzene, 1,1,3-tris(2-methyl-4-hydroxy-5-tert-butylphenyl)butane, (2,4,6-trioxo-1,3,5-triazine-1,3,5 (2H,4H,6H)-triyl)triethylene tris[3-(3,5-di-tert-butyl-4-hydroxyphenyl)propionate], tris(3,5-di-tert-butyl-4-hydroxybenzyl)isocyanurate, Tris(4-tert-butyl-3-hydroxy-2,6-dimethylbenzyl)isocyanurate, ethylene bis[3,3-bis(3-tert-butyl-4-hydroxyphenyl)butyrate], and 2,6-bis[[3-(1,1-dimethylethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S), 2-Methyl-4,6-bis(octylsulfanylmethyl)phenol, thiodiethylene bis[3-(3, 5-di-tert-butyl-4-hydroxyphenyl)propionate], 2,6-di-tert-butyl-4-(4,6-bis(octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl] methyl]butylmalonate, 2,4-di-tert-butylphenyl 3,5-di-tert-butyl-4-hydroxybenzoate, hexadecyl 3,5-di-tert-butyl-4-hydroxy-benzoate, 2-(1,1-dimethylethyl)-6-[[3-(1,1-dimethylethyl)-2-hydroxy-5-methylphenyl]methyl]-4-methylphenyl acrylate, and CAS nr. 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS nr. 68411-46-1 (Antioxidant 5057), and 4,4-bis(alpha,alpha-dimethylbenzyl)diphenylamine (Antioxidant KY 405). Preferably, the antioxidant is selected from pentaerythritol tetrakis[3-(3',5'-di-tert-butyl-4'-hydroxyphenyl)propionate] (herein referred to as Irganox 1010), tris(2,4-ditert-butylphenyl) phosphite (herein referred to as Irgafos 168), or a mixture thereof.

In an embodiment, the polymer composition may further comprise a styrenic copolymer as additive, preferably wherein the styrenic copolymer is selected from styrene-butadiene-styrene block copolymer (SBS) or styrene-ethylene-butadiene-styrene block copolymer (SEBS).

Preferably, the styrenic copolymer is a styrenic block copolymer. Suitable styrenic block copolymers include at least two monoalkenyl arene blocks, preferably two polystyrene blocks, separated by a block of a saturated conjugated diene, such as a saturated polybutadiene block. Suitable unsaturated block copolymers include, but are not limited to, those represented by the following formulas: A-B—R(—B-A)$_n$, or A$_x$-(BA-)$_y$-BA wherein each A is a polymer block comprising a vinyl aromatic monomer, such as styrene, and each B is a polymer block comprising a conjugated diene, such as isoprene or butadiene, and optionally a vinyl aromatic monomer, such as styrene; R is the remnant of a multifunctional coupling agent (if R is present, the block copolymer can be a star or branched block copolymer); n is an integer from 1 to 5; x is zero or 1; and y is a real number from zero to 4.

In a preferred embodiment, the article has a surface resistance of at least $10^6$ ohms as determined according to ASTM D257-07, preferably at least $10^7$ ohms, more preferably at least $10^8$ ohms, more preferably at least $10^9$ ohms, more preferably at least $10^{10}$ ohms, and more preferably at least $10^{11}$ ohms before being submitted for a determined period of time of less than 5 minutes to the temperature of switch. Thus, at its initial state, the article comprises an electrically insulating or at least dissipative material.

In the context of the invention the terms "electrically insulating" or "dissipative material" or "conductive material" related to the article are understood in the meaning of the standard ANSI/ESD S541-2008.

In all embodiments, the surface resistance of the article is preferably divided by at least 100, more preferably divided by at least 1000 and even more preferably divided by at least 10000 when said article is submitted for a determined period of time of less than 5 minutes to a temperature of switch
i) ranging from Tg+10° C. to Tg+250° C., preferably from Tg+100° C. to Tg+250° C., if the polymer composition comprises an amorphous polymer, or
ii) ranging from Tm−80° C. to Tm+250° C., preferably from Tm to Tm+250° C., if the polymer composition comprises a semi-crystalline polymer.

In an embodiment, the surface resistance of the article becomes preferably less than $10^6$ ohms, more preferably less than $10^5$ ohms and even more preferably less than $10^4$ ohms when said article is submitted for a determined period of time of less than 5 minutes to a temperature of switch, provided the initial surface resistance of the article is preferably at least $10^7$ ohms.

The thermal conductivity of the article is not significantly changed by the electrical conductivity change. So, after the above-described electrical conductivity change, if the sample is cooled to the initial temperature, the thermal conductivity of the initial article is recovered. So, thermally conductive article could be produced, which are electrically insulating or electrically conductive depending on the process history.

Preferably, the surface resistance of the article is divided by at least 10, preferably by at least 100, when said article is submitted for less than 4 minutes, preferably less than 2 minutes, to the temperature of switch.

According to the invention, the polymer used in the polymer composition is chosen to fit with the temperature at which it is desirable for the thermal switch device to switch from an electrically insulating or at least dissipative material to a conductive or at least electrically dissipative material, wherein the surface resistance is divided by at least 10, preferably by at least 100, compared to the initial surface resistance. The period of time necessary for the switch is determined as a function of the thickness of the article and of the temperature of switch. The higher temperature of switch is used the quicker is the switch. The thinner is the article; the quicker is the switch.

For example, when the polymer composition comprises polystyrene having a glass transition temperature of about 100° C., the article will switch, in order to divide its surface resistance by at least 10, preferably at least 100, when being submitted at a temperature ranging from about 110° C. (Tg+10° C.) to about 350° C. (Tg+250° C.). The time for the article to switch is longer when the article is submitted at a temperature of 110° C. than when the article is submitted at a temperature of 350° C.

If the polymer composition comprises polycarbonate having a glass transition temperature of about 147° C. the article will switch, in order to divide its surface resistance by at least 10, preferably at least 100, when being submitted at a temperature ranging from about 157° C. (Tg+10° C.) to about 397° C. (Tg+250° C.).

If the polymer composition comprises polyethylene having a melting temperature of about 120° C. the article will switch, in order to divide its surface resistance by at least 10, preferably at least 100, when being submitted at a temperature ranging from 40° C. (Tm−80° C.) to about 370° C. (Tm+250° C.).

If the polymer composition comprises polypropylene having a melting temperature of about 150° C. the article will switch, in order to divide its surface resistance by at least 10, preferably at least 100, when being submitted at a temperature ranging from 70° C. (Tm−80° C.) to about 400° C. (Tm+250° C.).

Thus, the person skilled in the art will select the polymer composition in accordance with his need regarding the temperature at which it is desirable for the article to switch by dividing its surface resistance by at least 10, preferably by at least 100.

Moreover, for a given thickness, the person skilled in the art may select the polymer composition in accordance with the temperature of switch that will be applied to the article. Indeed, for example at 200° C., a polymer composition containing polystyrene will require less time to switch than a polymer composition containing polycarbonate.

Therefore in a preferred embodiment, the polymer composition comprises an amorphous polymer and the surface resistance of the article is divided by at least 10 when said article is submitted for less than 5 minutes, preferably less than 2 minutes, to a temperature ranging from Tg+75° C. to Tg+250° C., preferably from Tg+100° C. to Tg+250° C.

In another preferred embodiment, the polymer composition comprises a semi-crystalline polymer and the surface resistance of the article is divided by at least 10 when said article is submitted for less than 5 minutes, preferably less than 2 minutes, to a temperature ranging from Tm to Tm+250° C.

In an embodiment, the article is a film, a sheet, a formed sheet, a pipe or an injected article.

Preferably, the article is a monolayered sheet made of the polymer composition according to the invention, i.e. a polymer composition comprising:

from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material, wherein said polymer composition has a surface resistance of less than $10^4$ ohms before being processed to form the article.

The article can also be multilayered sheet comprising at least two coextruded layers of different material wherein at least one of the layer is made of the polymer composition according to the invention, i.e. a polymer composition comprising:

from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material, wherein said polymer composition has a surface resistance of less than $10^4$ ohms before being processed to form the article. Preferably the multilayered sheet comprises three layers, wherein at least one of the outer layers is made of the polymer composition according to the invention.

Of course the monolayered or multilayered sheet according to the invention has an initial surface resistance of at least $10^5$ ohms and the surface resistance of the sheet is divided by at least 10, preferably at least 100, when said sheet is submitted for a determined period of time of less than 5 minutes to a temperature of switch i) ranging from Tg+10° C. to Tg+250° C., preferably from Tg+75° C. to Tg+250° C., if the polymer composition comprises an amorphous polymer, or ii) ranging from Tm−80° C. to Tm+250° C., preferably from Tm to Tm+250° C., if the polymer composition comprises a semi-crystalline polymer.

B—Process to Produce the Article

The invention also encompasses a process to produce an article, as defined above, suitable to act as a thermal switch device, comprising the steps of:

a) providing a polymer composition having a surface resistance of less than $10^4$ ohms, said polymer composition comprising:

from 50 to 99.9 wt % relative to the total weight of the polymer composition, of a polymer being selected from an amorphous polymer having a glass transition temperature Tg, a semi-crystalline polymer having a melting temperature Tm or a mixture thereof, and from 0.1 to 50 wt % relative to the total weight of the polymer composition, of a conductive material;

b) forming or pre-forming an article; and c) cooling the article by contact with a cooling device system or medium using a temperature of at least Tg−20° C. if the polymer composition comprises an amorphous polymer or at least Tm−20° C. if the polymer composition comprises a semi-crystalline polymer.

In an embodiment of the invention, the polymer composition is a mixture of amorphous and semi-crystalline polymers. The person skilled in the art may determine via known methods, such as scanning electron microscopy (SEM) which of the polymer between the amorphous polymer and the semi-crystalline polymer forms the continuous polymeric phase of the polymer composition, and select the temperature for cooling the article as being:
i) of at least Tg−20° C. if the polymer composition comprises an amorphous polymer forming the continuous polymeric phase, or
ii) of at least Tm−20° C. if the polymer composition comprises a semi-crystalline polymer forming the continuous polymeric phase.

In case of two immiscible polymers, Tg or Tm refer to the value of Tg or Tm of the polymer of the continuous phase. In case of continuity of the phases, the phase containing the highest conductive material content has to be considered to determine the Tg and the Tm to be considered. In case of a mixture of miscible polymers (like e.g. polypropylene-polybutene blends), Tm or Tg of the final mixture has to be considered.

Preferably, the step b) of forming or pre-forming an article comprises forming or pre-forming an article at a temperature ranging from Tg to Tg+100° C. if the polymer composition comprises an amorphous polymer or ranging from Tm to Tm+60° C. if the polymer composition comprises a semi-crystalline polymer. Any transformation process (injection, extrusion, . . . ) such that a shear or an elongational motion is imposed during the process is suitable to produce the article of the invention but compression in a press or any other process characterized by "no motion of the polymer composition during processing" is not suitable. For example, rotomoulding is not suitable.

In an embodiment, the step c) comprises cooling the article by a cooling device system using a temperature ranging from Tg−20° C. to Tg−150° C. if the polymer composition comprises an amorphous polymer or ranging from Tm−20° C. to Tm−150° C. if the polymer composition comprises a semi-crystalline polymer.

The step c) of the process is a cooling step that is to be performed with a cooling rate sufficient to freeze the structure obtained during step b). Step c) is a hardening step. The person skilled in the art will select the cooling rate in order to keep the electrically insulating or at least dissipative properties of the article.

Surprisingly, it has been observed that a polymer composition being conductive or at least dissipative before being processed to form an article may lose its electrical properties, so as to become electrically insulating or at least dissipative, under certain process conditions. Said process conditions comprise a first mechanical step disturbing the network of the conductive material of the polymer composition by using medium or high shear rates, and a second step of hardening where the structure of the disturbed network is frozen by a fast or relatively fast cooling system. The electrical properties can further be recovered when the article is annealed by a later submission to the temperature of switch. Thus, in accordance with the invention the cooling step c) is to be performed as quickly as possible.

Without being linked to any theory, it is believed that when producing the article such as forming a sheet or a film, due to the shear rate, an additive like the conductive material (e.g. carbon nanotubes) will preferably be located in the centre of the article. Moreover, due to shear/elongational motion imposed during the article production process, any remaining conductive material (e.g. carbon nanotubes) close to the border will be strongly oriented and thus inefficient in terms of electrical conductivity. Upon subsequent heating of the article, the conductive material (e.g. carbon nanotubes) lose any orientation they could have and/or they also migrate closer to the surface, thus that the article become conductive or at least, dissipative.

Thus compared to prior art switch devices, the article according to the invention is advantageous as it may have no moving parts nor exposed, fragile, components and may therefore be mechanically stable. The process of production of the article is simple and easy to implement such that the production costs associated are quite low. Moreover, the intrinsic nature of the switch, being in the structure of the polymer composition itself, allows using the article for the production of flexible devices. Finally, said intrinsic origin of the thermal switch is due to a simple physical mechanism and so it is a very robust, making the whole device strongly reliable, and suitable for flexible devices.

The polymer composition provided in step a) can be obtained by any process known by the person skilled in the art.

In an embodiment, the polymer composition is a masterbatch and comprises an amorphous polymer and a conductive material, preferably carbon nanotubes, and is produced by the steps of:
providing a conductive material, preferably carbon nanotubes;
providing a first amorphous polymer, said first amorphous polymer having a glass transition temperature Tg1, and a melt flow index MFI1 of at least 10 g/10 min determined at 200° C. under a load of 5 kg according to ISO1133:2005 procedure B condition H, and optionally from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide;
blending together said conductive material, preferably carbon nanotubes, and said first amorphous polymer by extrusion in an extruder at a barrel temperature ranging from Tg1 to Tg1+80° C., preferably Tg1+5° C. to Tg1+50° C.,
the glass transition temperature being determined according to ISO 11357-2:2013.

Preferably, the step of blending together said conductive material, being preferably carbon nanotubes, and said first amorphous polymer by extrusion is conducted on co-rotating twin screw extruder at a screw speed of at least 250 rpm, with preference at least 300 rpm, with preference at least 500 rpm.

Preferably the step of providing conductive material, preferably carbon nanotubes, comprises selecting the quantity of conductive material, preferably carbon nanotubes, to be blended with the first amorphous polymer in order to obtain a masterbatch comprising at least 5%, and preferably from 5% to 15%, by weight of conductive material based on the total weight of the masterbatch, the conductive material being preferably carbon nanotube and its content is determined according to ISO 11358.

Preferably, the masterbatch has a surface resistance of at most $10^2$ Ohm as determined according to ASTM D257-07, and/or high load melt flow index HLMI1 of less than 20 g/10 min determined under a load of 21.6 kg according to ISO 1133:2005.

In a preferred embodiment, polymer composition is a composite material and comprises a mixture of a first and a second amorphous polymer and the composite material comprises from 0.05 to 1.95% by weight of conductive material based on the total weight of the composite material, the conductive material being preferably carbon nanotube and its content in the masterbatch is determined according to ISO 11358, said process comprising the steps of:

providing a masterbatch comprising a first amorphous polymer and at least 5%, and preferably from 5% to 15%, by weight of conductive material, preferably carbon nanotubes based on the total weight of the masterbatch as determined according to ISO11358, and wherein the first amorphous polymer has a melt flow index MFI1 of at least 10 g/10 min determined according to ISO 1133:2005;

providing a second amorphous polymer having a glass transition temperature Tg2;

blending together the masterbatch and the second amorphous polymer by extrusion in an extruder at a barrel temperature ranging from Tg2+100° C. to Tg2+200° C., preferably ranging from Tg2+120° C. to Tg2+180° C., the glass transition temperature being determined according to according to ISO 11357-2:2013.

Said composite material has a surface resistivity of at most $10^4$ Ohm/sq as determined according to ASTM D257-07 and/or a surface resistance of at most $10^4$ Ohms as determined according to ASTM D257-07. Preferably, the step of providing a masterbatch include a step of preparation of the masterbatch as described above.

Advantageously, the first amorphous polymer is selected to have a melt flow index MFI1 and second amorphous polymer having a melt flow index MF12, the process further comprises the step of selecting the first and second amorphous polymer so that MFI1 has a value of at least twice the value of MF12.

More preferably at least one of the first or second amorphous polymer is polystyrene, said polystyrene being selected from polystyrene, modified polystyrene, or combination of polystyrene and modified polystyrene.

In another embodiment, the polymer composition is a masterbatch and comprises a semi-crystalline polymer and a conductive material, preferably carbon nanotubes, and is produced by the steps of:

providing conductive material, preferably carbon nanotubes;

providing a first semi-crystalline polymer, said first semi-crystalline polymer having a melting temperature Tm1, and a HLMI1 of at least 1 as determined under a load of 21.6 kg according to ISO 1133:2005, and optionally from 0.01 to 4.0 by weight of one or more additive based on the total weight of the masterbatch, the one or more additive being selected from waxes, tristearin, zinc stearate, calcium stearate, magnesium stearate, erucyl amide, oleic acid amide, ethylene-acrylic acid copolymer, ethylene vinyl acetate copolymer and cetyl trimethyl ammonium bromide;

blending together said conductive material, preferably carbon nanotubes, and said first amorphous polymer by extrusion in an extruder at a barrel temperature ranging from Tm1 to Tm1+10° C., the melting temperature being determined according to ISO 11357-3:2013.

Preferably, the step of blending together said conductive material, preferably carbon nanotubes, and said first semi-crystalline polymer by extrusion is conducted on co-rotating twin screw extruder at a screw speed of at least 250 rpm, with preference at least 300 rpm, with preference at least 500 rpm.

Preferably the step of providing conductive material, preferably carbon nanotubes, comprises selecting the quantity of conductive material, preferably carbon nanotubes, to be blended with the first semi-crystalline polymer in order to obtain a masterbatch comprising at least 5%, and preferably from 5% to 15%, by weight of conductive material based on the total weight of the masterbatch, the conductive material being preferably carbon nanotube and its content in the masterbatch is determined according to ISO 11358.

Preferably, the masterbatch has a surface resistivity of at most $1\times10^2$ Ohm/sq as determined according to ASTM D257-07 and/or a surface resistance of at most $1\times10^4$ Ohms as determined according to ASTM D257-07

In a preferred embodiment, polymer composition is a composite material and comprises a mixture of a first and a second semi-crystalline polymer and the composite material comprises from 0.05 to 1.95% by weight of conductive material based on the total weight of the composite material, the conductive material being preferably carbon nanotube and its content in the masterbatch is determined according to ISO 11358, said process comprising the steps of:

providing a masterbatch comprising a first semi-crystalline polymer having a melting temperature Tm1 and at least 5%, and preferably from 5% to 15%, by weight of conductive material based on the total weight of the masterbatch, the conductive material being preferably carbon nanotube and its content in the masterbatch is determined according to ISO 11358, and wherein the first semi-crystalline polymer has a HLMI1 of at least 1 and preferably ranging from 1 to 100 as determined under a load of 21.6 kg according to ISO 1133;

providing a second semi-crystalline polymer being miscible with the first semi-crystalline, having a melting temperature Tm2=Tm1+/−5° C., and having a melt flow index MFI2 of at most 20 as determined according to ISO 1133 under a load of 2.16 kg at the same temperature use for determination of the HLMI1 of the first semi-crystalline polymer;

blending together the masterbatch and the second semi-crystalline polymer by extrusion in an extruder at a barrel temperature ranging from Tm2 to Tm2+250° C.; the melting temperature being determined according to ISO 11357-3: 2013.

In a preferred embodiment, the first and second semi-crystalline polymer are selected from homo- and co-polymer of ethylene (PE), homo- and co-polymer of propylene (PP), impact copolymer of propylene (iPP), polylactide (PLA), or any combination thereof. More preferably, the homo- and co-polymer of ethylene (PE), homo- and co-polymer of propylene (PP), impact copolymer of propylene (iPP), or any combination thereof. In all embodiments, the polypropylene may be syndiotactic or isotactic polypropylene. Even more preferably, the first and the second semi-crystalline polymer are both polyethylene, or are both polypropylene.

Said composite material has a surface resistivity of at most $1\times10^4$ Ohm as determined according to ASTM D257-07 and/or a surface resistance of at most $1\times10^4$ Ohms as determined according to ASTM D257-07. Preferably, the step of providing a masterbatch include a step of preparation of the masterbatch as described above.

In all embodiments the polymer composition comprises preferably from 0.05 to 1.95 by weight of a conductive material based on the total weight of the polymer composition, the conductive material being preferably carbon nanotube and its content in the masterbatch is determined according to ISO 11358, preferably at most 1.75% by weight, for example at most 1.50% by weight, for example at most 1.25% by weight, for example at most 1.00% by weight, for example at most 0.95%, for example at most 0.90% by weight based on the total weight of the polymer composition.

In some embodiments, the step b) of forming or performing the article is made by extrusion or injection. Extrusion and injection are processes providing sufficient shear rate to disturb the conductive material network of the polymer composition.

According to the invention, the step b) of forming or performing an article at a temperature ranging from Tg to Tg+100° C. when the polymer composition comprises an amorphous polymer or ranging from Tm to Tm+60° C. when the polymer composition comprises a semi-crystalline polymer, allows applying sufficient shear rate to disturb the conductive material network of the polymer composition.

In some embodiments, the process comprises a step b) of pre-forming the article resulting in a pre-formed article wherein the process further comprises after step c), a step d) of forming the article from the pre-formed article at a temperature less than Tg when the polymer composition comprises an amorphous polymer or less than Tm when the polymer composition comprises a semi-crystalline polymer.

For example, the step b) is a step of pre-forming an article, the pre-forming article being a sheet obtained from the polymer composition. The sheet being processed in a further step d) which for example is a step of thermoforming, such as to obtain a specific shape. The step d) of thermoforming is therefore conducted at a temperature less than Tg when the polymer composition comprises an amorphous polymer or less than Tm when the polymer composition comprises a semi-crystalline polymer, in order to avoid the switch of the article from an electrically insulating or at least dissipative material to a conductive or at least dissipative material with a surface resistance divided by at least 10, preferably by at least 100.

During the whole process, in order to obtain the desired result of having a conductive or at least dissipative polymer composition being processed in order to form an electrically insulating or at least dissipative article, and is not immediately obtained, the person skilled in the art may:
- at step a): select a starting polymer composition having a higher surface resistance, for example by selecting a polymer composition with a lower content in conductive material, provided that the starting polymer composition still have a surface resistance of not more than $10^4$ ohms as determined according to ASTM D257-07, and/or
- at step b) use a higher shear rate and/or a lower processing temperature, and/or
- at step c) use a higher cooling rate.

Moreover, if further operations are required to integrate the article in a more complex device, it is important to avoid any thermal overshoot of the article close to the temperature where electrical conductivity is recovered.

EXAMPLES

Articles according to the invention were prepared. The starting polymer composition was prepared using a two step process comprising forming a masterbatch with a first polymer and diluting said masterbatch in a second polymer. In some examples, the polymer composition comprised polystyrene as first polymer, high-impact polystyrene as second polymer and carbon nanotubes as conductive material. In other examples, the polymer composition comprised polyethylene as first and second polymers and carbon nanotubes as conductive material.

Methods

The content of carbon nanotubes in percentage by weight in blends (% CNT) can be determined by thermal gravimetric analysis (TGA) according to ISO 11358, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600 C, the gas was switched to air (100 ml/min), and the carbon oxidized, yielding to the carbon content of carbon nanotubes in the sample (% C-sample). The % C-sample value was the average of 3 measurements. The content of carbon nanotubes % by weight in sample (% CNT) was then determined by dividing the carbon content of carbon nanotubes % by weight in samples (% C-sample) by the carbon content of the carbon nanotubes in % by weight (% C-CNT) and multiplying by 100.

% CNT=% $C$-sample/% $C$-CNT*100

Surface resistance, ($R_s$) is the ratio of the dc voltage applied to two electrodes (on the surface of a specimen) to the current between them. Unit is Ohm (Ω).

Volume resistance, ($R_v$) is the ratio of the dc voltage applied to two electrodes (on or in a specimen) to the current in the volume of the specimen between the electrodes. Unit is Ohm (Ω).

Surface resistivity, ($\rho_s$) is the surface resistance multiplied by that ratio of specimen surface dimensions (width of electrodes defining the current path divided by the distance between electrodes) which transforms the measured resistance to that obtained if the electrodes had formed the opposite sides of a square. Unit is Ohm (Ω) or Ohms per square (Ω/sq).

Volume resistivity, ($\rho_v$) is the volume resistance multiplied by that ratio of specimen volume dimensions (cross-sectional area of the specimen between the electrodes divided by the distance between electrodes) which transforms the measured resistance to that resistance obtained if the electrodes had formed the opposite sides of a unit cube. Unit is Ohm·meter (Ω·m) or Ohm·centimeter (Ω·cm).

Surface/Volume resistance and resistivity can be measured using a variety of techniques known in the art including, for example, the method defined in ASTM procedure D257-07 or IEC procedure 61340-2-3:2000. In the examples, the measurement method is specified.

For all resistance/resistivity measurements, the samples were conditioned at 23° C./50% RH for minimum 4 hours for polystyrene-based samples and 24 hours for polyethylene-based samples, before running the test.

The surface resistance/resistivity ($R_s$, $\rho_s$) were measured according to ASTM D257-07 or according to IEC 61340-2-3:2000.

The surface resistance/resistivity ($R_s$, $\rho_s$) measured according to ASTM D-257-07 was done using a 2410 SourceMeter® apparatus using silver paint electrodes (made of two conductive paint lines using silver ink and an adhesive mask presenting 2 parallel slits 25 mm long, 1 mm wide and 2 mm apart). Measurements were done either on 2 mm thick compression molded plaque (at 200° C. for polystyrene-based samples or 230° C. for polyethylene-based samples) during 12 minutes, on extruded sheet or on injected sample. Measures of surface resistance were reported in Ohm (Ω) and converted to surface resistivity in Ohm/square (Ω/sq) using the following equation: $\rho_s = (R_s \times L)/d$, wherein: L is the paint line length (cm), d is the distance between the electrodes (cm).

The surface resistance/resistivity ($R_s$, $\rho_s$) measured according to IEC 61340-2-3:2000 was done using a Metriso® 2000 apparatus using concentric Ring Probe, Model 880. Measurements were done on extruded sheet or injected sample. Measures of surface resistance were reported in Ohm (Ω) and converted to surface resistivity in Ohm/square (Ω/sq) using the following equation: $\rho_s = R_s \times (d_1+g) \times \pi/g$, wherein: $d_1$ is diameter of the inner contact electrode (cm) and g is the distance (gap) between the contact electrodes (cm).

The volume resistance/resistivity ($R_v$, $\rho_v$) were measured according to IEC 61340-2-3:2000 and done using a Metriso® 2000 apparatus using concentric Ring Probe, Model 880 and metal counter electrode. Measurements were done on extruded sheet or injected sample. Measures of surface resistance were reported in Ohm (Ω) and converted to volume resistivity in Ohm centimeter (Ω·cm) using the following equation: $\rho_v = R_v \times A/t$, wherein: A is the area of the measuring electrode in cm$^2$ and t is the thickness of test specimen (cm).

The thermal conductivity is measured according to ISO 22007-2.

The melt flow index (MFI) of the polymers was measured according to ISO 1133 procedure B. The conditions were selected depending on the polymer considered as indicated in ISO 1133, For example, the MFI is determined under a load of 5 kg at a temperature of 200° C. according to ISO 1133 procedure B condition H for polystyrene. according to ISO 1133 procedure B condition D (190° C., 2.16 kg) for polyethylene, according to ISO 1133 procedure B condition M (230° C., 2.16 kg) for polypropylene, etc.

The high melt flow index (HLMI) was determined under a load of 21.6 kg at a given temperature (200° C. for polystyrene, 190° C. for polyethylene, 230° C. for polypropylene, etc.) according to ISO 1133:2005.

The molecular weight of the polymer is determined by Gel Permeation Chromatography (GPC).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Density of the Polymers is Determined According to ISO 1183

The degree of crystallinity of the semi-crystalline polymer is determined according to ASTM D3418-12.

The glass transition temperature can be determined by the method according to ISO 11357-2:2013.

The melting temperature of a semi-crystalline polymer is determined according to ISO 11357-3:2013.

The agglomerate area fraction (U %) is determined in accordance with ASTM D-2663-14

Scanning Electron Microscope (SEM) analysis is described in various documents like "*Préparation des échantillons pour MEB et microanalyse*"—Philippe Jonnard (GNMEBA)—EDP Sciences or "*Polymer Microscopy*"—Linda C. Sawyer and David T. Grubb—Ed. Chaoman and Hall.

Example 1: Preparation of the Polymer Composition

Example 1-1: Preparation of a Polymer Composition Comprising an Amorphous Polymer, i.e. Polystyrene The carbon nanotubes used were multi-walled carbon nanotubes Nanocyl™ NC 7000, commercially available from Nanocyl. These nanotubes had a surface area of 250-300 m$^2$/g (measured by BET method), a carbon purity of about 90% by weight (measured by thermal gravimetric analysis), an average diameter of 9.5 nm and an average length of 1.5 μm (as measured by transmission electron microscopy).

The first amorphous polymer used was polystyrene with a melt flow index of 30 g/10 mn as measured according to ISO 1133 procedure B condition H (200° C., 5 kg), a density of 1.05 g/cm$^3$ (ISO 1183), a flexural modulus of 2900 MPa (ISO 178), a surface resistivity of more than 10$^{14}$ Ohms as measured according to ISO IEC 93. The molecular weight of the first amorphous polymer was Mw: 112 000 g/mol. Thus, the melt flow index of the first amorphous polymer was at least 10 g/10 min. The polystyrene showed a glass transition temperature Tg of 104° C. (i.e.: Tg1).

The masterbatches were prepared by blending polystyrene and carbon nanotubes, using classical twin-screw extrusion process. Carbon nanotubes powder and polystyrene were introduced into the extruder such as to obtain a CNT content of about 10% by weight based on the total weight of the blend. The masterbatches were blended on Leitztriz co-rotating twin screw extruder with a L/D of 52 (D=27), at a barrel temperature of 110-145° C. for M1 and M2.

The melt temperature measured with thermocouple showed that the material had a temperature in the barrel of about 150° C. to 200° C. If necessary, the melt temperature could have been lowered if necessary by using a better cooling device on the extruder.

For Masterbatch M1 the screw speed was fixed at 250 rpm, at a throughput of 14 kg/h. For Masterbatch M2 the screw speed was fixed at 500 rpm, at a throughput of 14 kg/h. The barrel temperature was comprised between Tg1 to Tg1+80° C., here between 104° C. to 184° C.

The properties of the polystyrene based masterbatchs are provided in below table 1.1

TABLE 1.1

| Polystyrene based masterbatches | | |
| --- | --- | --- |
| Blends | M1 | M2 |
| PS (wt %) | 90 | 90 |
| PS MFI (g/10 min) | 30 | 30 |
| CNT (wt %) | 10 | 10 |
| Additive | no | no |
| Additive (wt %) | — | — |
| Screw speed (RPM) | 250 | 500 |
| Throughput (kg/h) | 14 | 14 |
| Barrel temperature (° C.) | 110-145 | 110-145 |
| Melt temperature (° C.) | 155 | 180 |
| HLMI (g/10 min) of the blend | 15.8 | 6.7 |
| Surface resistance[(1)], $R_S$ (ohm) | $2.5 \times 10^0$ | $2.2 \times 10^0$ |
| Surface resistivity[(1)], $\rho_S$ (Ohm/sq) | $3.1 \times 10^1$ | $2.8 \times 10^1$ |

[(1)]as measured on compression molded plaque from pellets according to ASTM D-257-07

The masterbatch M2 is then diluted in a second amorphous polymer to obtain a polymer composition according to the invention.

The high impact polystyrene (HIPS) selected in accordance to the invention has a melt flow index of 2.8 g/10 mn as measured according to ISO 1133 procedure B condition H (200° C., 5 kg), a density of 1.04 g/cm³ (ISO 1183), a flexural modulus of 1600 MP (ISO 178), a surface resistivity >10¹³ Ohms as measured according to ISO IEC 93. The melt flow index of the second amorphous polymer is not more that 5 g/10 min. The HIPS shows a glass transition temperature of 100° C. (i.e. Tg2). The molecular weight of the second amorphous polymer is Mw: 225 000 g/mol.

The HIPS is chosen so as the melt flow index of the first amorphous polymer used in the inventive masterbatches has a melt flow index higher than the second amorphous polymer. In particular the melt flow index of the first amorphous polymer has a value (i.e 30 g/min) of at least twice the value of the melt flow index of the second amorphous polymer (i.e. 2.8 g/min).

Example B1—Composite Material Containing 1 wt % of CNT le;2qIn the dilution step, the masterbatch is blended with the second amorphous polymer, using classical single-screw extrusion process. Both first and second polymer compositions are introduced in the extruder through the hoper. The extrusion is conducted in a brabender single-screw extruder using with a L/D of 25 (D=19) at a barrel temperature of 200° C. and the screw speed is fixed at 60 rpm.

Examples B2 to B6—Composite Material Containing 0.9 and 1.5 wt % of CNT

In the dilution step, the masterbatches are blended with the second amorphous polymer having a Tg2 of 104° C., using classical twin-screw extrusion process. Both first and second polymer composition are introduced in the extruder through the main feed. The extrusion is conducted in a brabender twin-screw extruder with a L/D of 40 (D=20), at a barrel temperature of 220-260° C. and the screw speed is fixed at 80 or 250 rpm, at a throughput of 2 kg/h. The barrel temperature is between Tg2+120° C. to Tg2+200° C., here between 220° C. to 300° C.

The properties of the polymer compositions are provided in below table 2-1

TABLE 2.1

| Amorphous polymer compositions | | | | | | |
| --- | --- | --- | --- | --- | --- | --- |
| Blends | B1 | B2 | B3 | B4 | B5 | B6 |
| wt % HIPS | 90 | 91 | 91 | 91 | 87.5 | 85 |
| HIPS MFI (g/10 min) | 2.8 | 2.8 | 2.8 | 2.8 | 2.8 | 11.5 |
| Masterbatch | M2 | M2 | M2 | M2 | M2 | M2 |
| Masterbatch wt % | 10 | 9 | 9 | 9 | 12.5 | 15 |
| wt % CNT | 1 | 0.9 | 0.9 | 0.9 | 1.25 | 1.5 |
| Screw speed rpm | 60 | 80 | 80 | 80 | 80 | 250 |
| Throughput kg/h | — | 2 | 2 | 2 | 2 | 3 |
| Barrel temperature (° C.) | 200 | 220 | 240 | 260 | 230 | 230 |
| Surface resistance[(1)], $R_S$ (ohm) | $4.3 \times 10^2$ | $5.8 \times 10^2$ | $1.4 \times 10^2$ | $6.8 \times 10^1$ | $5.5 \times 10^1$ | $3.9 \times 10^1$ |
| Surface resistivity[(1)], $\rho_S$ (Ohm/sq) | $5.4 \times 10^3$ | $7.2 \times 10^3$ | $1.8 \times 10^3$ | $8.5 \times 10^2$ | $6.9 \times 10^2$ | $4.9 \times 10^2$ |
| U (%) | — | 0.77 ± 0.44 | — | — | — | — |

[(1)]as measured on compression molded plaque from pellets according to ASTM D257-07

Example 1-2: Preparation of a Polymer Composition Comprising a Semi-Crystalline Polymer, i.e. Polyethylene The carbon nanotubes used were multi-walled carbon nanotubes Nanocyl™ NC 7000, commercially available from Nanocyl. These nanotubes had a surface area of 250-300 m²/g (measured by BET method), a carbon purity of about 90% by weight (measured by thermal gravimetric analysis), an average diameter of 9.5 nm and an average length of 1.5 μm (as measured by transmission electron microscopy).

The first semi-crystalline polymer used was polyethylene with a melt flow index of 16 g/10 mn as measured according to ISO 1133:2005 procedure B condition H (190° C., 2.16 kg), a density of 0.935 g/cm³ (ISO 1183) and a Tm of 125° C. (ISO 11357-3:2013).

The masterbatches were prepared by blending polyethylene and carbon nanotubes, using classical twin-screw extrusion process. Carbon nanotubes powder and polyethylene were introduced into the extruder such as to obtain a CNT content of about 10% by weight based on the total weight of the blend. The masterbatches were blended on Leitztriz co-rotating twin screw extruder with a L/D of 52 (D=27).

The melt temperature measured with thermocouple showed that the material had a temperature in the barrel of about 150° C. for M3 and about 250° C. for M4. The melt temperature could have been lowered if necessary by using a better cooling device on the extruder.

The properties of the polyethylene based masterbatchs are provided in below table 1.2

TABLE 1.2

Polyethylene based masterbatches

| Blends | M3 | M4 |
|---|---|---|
| PE (wt %) | 90 | 90 |
| PE MFI (g/10 min) | 16 | 16 |
| CNT (wt %) | 10 | 10 |
| Additive | no | no |
| Screw speed (RPM) | 500 | 500 |
| Throughput (kg/h) | 14 | 14 |
| Melt temperature (° C.) | 150 | 250 |
| HLMI (g/10 min) of the blend | 24.3 | 23.2 |
| Surface resistance[(1)], $R_S$ (ohm) | $8.2 \times 10^0$ | $8.1 \times 10^0$ |
| Surface resistivity[(1)], $\rho_S$ (Ohm/sq) | $1.0 \times 10^2$ | $1.0 \times 10^2$ |

[(1)]as measured on compression molded plaque from pellets according to ASTM D-257-07

The masterbatch M3 is then diluted in a second semi-crystalline polymer to obtain a polymer composition according to the invention. The second polyethylene (PE2) selected in accordance to the invention has a melt flow index of 0.8 g/10 mn as measured according to ISO 1133:2005 procedure B condition D (190° C., 2.16 kg), a density of 0.934 g/cm³ (ISO 1183).

Example B7—Composite Material Containing 2 wt % of CNT

In the dilution step, the masterbatches were blended with the second semi-crystalline polymer being polyethylene having a Tm2 of 119° C., using classical twin-screw extrusion process. Both first and second polymer compositions were introduced in the extruder through the main feed. The extrusion was conducted in a Brabender twin-screw extruder with a L/D of 40 (D=20), at a barrel temperature of 220-260° C. and the screw speed was fixed at 80 rpm, at a throughput of 2 kg/h. The properties of the polymer compositions are provided in below table 2-2.

TABLE 2-2 semi-crystalline polymer composition

| Blends | B7 |
|---|---|
| wt % PE2 | 80 |
| PE2 MFI (g/10 min) | 0.8 |
| Masterbatch | M3 |
| Masterbatch wt % | 20 |
| wt % CNT | 2 |
| Screw speed RPM | 200 |
| Throughput kg/h | 2 |
| Barrel temperature (° C.) | 230 |
| Surface resistance[(1)], $R_S$ (ohm) | $2.4 \times 10^1$ |
| Surface resistivity[(1)], $\rho_S$ (Ohm/sq) | $3.0 \times 10^2$ |

[(1)]as measured on compression molded plaque from pellets according to ASTM D-257-07

Example 2: Preparation of the Article by Extrusion

The composition B2 was extruded to form a sheet having a thickness of about 500 μm on a Collin sheet extruder type 20×25D, having a fishtail die of 150 mm. The conditions of process and their results on the electrical properties of the articles are given in table 3.

TABLE 3

Sheet extrusion process conditions

| Sheet | S1 | S2 | S3 |
|---|---|---|---|
| Composition | B5 | B5 | B7 |
| Surface resistance[(1)], $R_S$ (ohm) before extrusion | $5.5 \times 10^1$ | $5.5 \times 10^1$ | $2.4 \times 10^1$ |
| Surface resistivity[(1)], $\rho_S$ (Ohm/sq) before extrusion | $6.9 \times 10^2$ | $6.9 \times 10^2$ | $3.0 \times 10^2$ |
| Barrel temperature (° C.) | 240 | 190 | 210 |
| Melt temperature (° C.) | 210 | 186 | 203 |
| Screw speed (RPM) | 50 | 50 | 60 |
| Throughput (kg/h) | 2.8 | 2.8 | 2 |
| Roll speed (m/min) | 0.39 | 0.39 | 0.36 |
| Calender temp (° C.) | 90 | 35 | 25 |
| Sheet thickness (μm) | 550 | 480 | 400 |
| Surface resistance[(2)], $R_S$ (ohm) | $2.8 \times 10^3$ | $>2 \times 10^8$ | $>2 \times 10^8$ |
| Surface resistivity[(2)], $\rho_S$ (Ohm/sq) | $3.5 \times 10^4$ | $>2 \times 10^9$ | $>2 \times 10^9$ |
| Surface resistance[(3)], $R_S$ (ohm) | $2.5 \times 10^4$ | $5.1 \times 10^9$ | $1.0 \times 10^{11}$ |
| Surface resistivity[(3)], $\rho_S$ (Ohm/sq) | $2.5 \times 10^5$ | $5.1 \times 10^{10}$ | $1.0 \times 10^{12}$ |
| Volume resistance[(3)], $R_V$ (ohm) | $1.4 \times 10^4$ | $2.1 \times 10^{10}$ | $8.3 \times 10^{10}$ |
| Volume resistivity[(3)], $\rho_V$ (ohm · cm) | $1.0 \times 10^6$ | $2.7 \times 10^{12}$ | $1.5 \times 10^{13}$ |

[(1)]as measured on compression molded plaque from pellets according to ASTM D-257-07
[(2)]as measured on extruded sheet according to ASTM D-257-07
[(3)]as measured on extruded sheet according to IEC 61340-2-3: 2000

The above examples demonstrate the influence of the process condition regarding the electrical properties obtained on the article formed from a conductive composition. S1 is a comparative example in which the step of cooling the article was done by a cooling system device using a temperature higher than Tg−20° C. Starting from the same polymer composition than S2, the extruded sheet S1 obtained showed a surface resistance as measured according to ASTM D257-07 of 2.8×10³ ohms, whereas S2 a surface resistance as measured according to ASTM D257-07 of more than 1×10⁸ ohms.

Example 3: Thermal Switch Effect on the Extruded Article

The sheets S1 to S3 were submitted to an infra-red heating

In correlation with the sheet thickness, the IR radiants were put top and bottom at 400° C., at 10 cm gap from the sheet holder and let heat the samples up to 200° C., read on top side exiting the furnace. For a 450 μm sheet thickness, it must last at least 12 seconds; for a thicker sheet, the heat can last 20 seconds or more, the operator must adapt the heating time. Due to shrinkage effect during the process, the sample must be greater than the sample holder, to avoid holes and breakages. To make the ESD measurements, the sample was let cooled on the holder, in order to maintain the sheet flat.

The resistivity of the sheet was measured after the sheet was cool to ambient temperature and conditioned. The sheet heating conditions and the results on the electrical properties are given in table 4.

TABLE 4

Sheet heating conditions

| Sheet heating trial | T1 | T2 | T3 | T4 | T5 | T6 | T7 | T8 | T9 | T10 |
|---|---|---|---|---|---|---|---|---|---|---|
| Sheet | S2 | S2 | S2 | S2 | S1 | S1 | S3 | S3 | S3 | S3 |
| composition | B5 | B5 | B5 | B5 | B5 | B5 | B7 | B7 | B7 | B7 |
| Surf. Resistance$^{(1)}$, Rs of the sheet before IR heating (ohm) | $>2 \times 10^8$ | $>2 \times 10^8$ | $>2 \times 10^8$ | $>2 \times 10^8$ | $2.8 \times 10^3$ | $2.8 \times 10^3$ | $>2 \times 10^8$ | $>2 \times 10^8$ | $>2 \times 10^8$ | $>2 \times 10^8$ |
| Heating time (s) | 15 | 20 | 25 | 30 | 20 | 25 | 18 | 25 | 30 | 35 |
| Temperature reached at the surface of the sheet (° C.) | 187 | 200 | 222 | 235 | 192 | 209 | 153 | 206 | 221 | 235 |
| Surf. Resistance$^{(2)}$, Rs (ohm) | $1.4 \times 10^4$ | $3.3 \times 10^2$ | $1.1 \times 10^2$ | $7.5 \times 10^1$ | $2.1 \times 10^2$ | $1.2 \times 10^2$ | / | / | / | / |
| Surf. Resistivity$^{(2)}$, ps (Ohm/sq) | $1.7 \times 10^5$ | $4.1 \times 10^3$ | $1.4 \times 10^3$ | $9.4 \times 10^2$ | $2.6 \times 10^3$ | $1.6 \times 10^3$ | / | / | / | / |
| Surf. Resistance$^{(3)}$, Rs (ohm) | $3.0 \times 10^5$ | $2.7 \times 10^4$ | $1.7 \times 10^3$ | $<1 \times 10^3$ | $2.8 \times 10^3$ | $1.2 \times 10^3$ | $1.2 \times 10^{11}$ | $1.6 \times 10^6$ | $6.0 \times 10^5$ | $1.1 \times 10^5$ |
| Surf. Resistivity$^{(3)}$, ρs (ohm/sq) | $3.0 \times 10^6$ | $2.7 \times 10^5$ | $1.7 \times 10^4$ | $<1 \times 10^4$ | $2.8 \times 10^4$ | $1.2 \times 10^4$ | $1.2 \times 10^{12}$ | $1.6 \times 10^7$ | $6.0 \times 10^6$ | $1.1 \times 10^6$ |
| Vol. resistance$^{(3)}$, Rv (ohm) | $1.2 \times 10^6$ | $1.0 \times 10^5$ | $3.3 \times 10^3$ | $2.1 \times 10^3$ | $7.8 \times 10^3$ | $2.8 \times 10^3$ | $1.3 \times 10^{11}$ | $1.0 \times 10^6$ | $3.8 \times 10^5$ | $1.1 \times 10^5$ |
| Vol. resistivity$^{(3)}$, ρv (ohm · cm) | $1.8 \times 10^8$ | $1.5 \times 10^7$ | $4.9 \times 10^5$ | $3.1 \times 10^5$ | $1.1 \times 10^6$ | $4.1 \times 10^5$ | $2.3 \times 10^{13}$ | $1.8 \times 10^8$ | $6.7 \times 10^7$ | $1.9 \times 10^7$ |

$^{(1)}$as measured on extruded sheet according to ASTM D257-07
$^{(2)}$as measured on thermally treated sheet according to ASTM D257-07
$^{(3)}$as measured on thermally treated sheet according to IEC 61340-2-3: 2000

The sheets S2 to S3 were also submitted to heat in a hydraulic compression press equipped with three heated platens in a safety shield. The space between platens was set at 7.4 cm and the three heated platens were heated at the same temperature (platens temperature) and let stabilized before the sheet heating tests. Samples were put on 125 μm polyimide sheet itself put on 400 μm aluminum sheet before introduction in the heated press during a controlled time. Samples are then removed of the press and let cooled on the polyimide and aluminum sheets in order to maintain the sheet flat. The resistivity of the sheet was measured after the sheet was cool to ambient temperature and conditioned. The sheet heating conditions and the results on the electrical properties are given in table 5 and 6. The heating trials demonstrate how to determine the period of time needed for the article to switch when submitted to a temperature of switch.

TABLE 6

Sheet heating conditions

| Sheet heating trial | T20 | T21 | T22 | T23 |
|---|---|---|---|---|
| Sheet | S3 | S3 | S3 | S3 |
| Composition | B7 | B7 | B7 | B7 |
| Surf. resistance$^{(1)}$, R$_S$ of the sheet before IR heating (ohm) | $>2 \times 10^8$ | $>2 \times 10^8$ | $>2 \times 10^8$ | $>2 \times 10^8$ |
| Heating time (min) | 1 | 10 | 20 | 30 |
| Platens temperature (° C.) | 200 | 200 | 200 | 200 |
| Surf. resistance$^{(2)}$, R$_S$ (ohm) | $>2 \times 10^8$ | $>2 \times 10^8$ | $1.5 \times 10^4$ | $5.0 \times 10^3$ |
| Surf. resistivity$^{(2)}$, ρ$_S$ (Ohm/sq) | $>2 \times 10^9$ | $>2 \times 10^9$ | $1.9 \times 10^5$ | $6.3 \times 10^4$ |

$^{(1)}$as measured on extruded sheet according to ASTM D257-07
$^{(2)}$as measured on thermally treated sheet according to ASTM D257-07

TABLE 5

Sheet heating conditions

| Sheet heating trial | T11 | T12 | T13 | T14 | T15 | T16 | T17 | T18 | T19 |
|---|---|---|---|---|---|---|---|---|---|
| Sheet | S2 | S2 | S2 | S2 | S2 | S2 | S2 | S2 | S2 |
| Composition | B5 | B5 | B5 | B5 | B5 | B5 | B5 | B5 | B5 |
| Surf. Resistance$^{(1)}$, Rs of the sheet before IR heating (ohm) | $>2 \times 10^8$ | $>2 \times 10^8$ | $>2 \times 10^8$ | $>2 \times 10^8$ | $>2 \times 10^8$ | $>2 \times 10^8$ | $>2 \times 10^8$ | $>2 \times 10^8$ | $>2 \times 10^8$ |
| Heating time (min) | 1 | 2 | 3 | 4 | 5 | 1 | 5 | 9 | 13 |
| Platens temperature (° C.) | 200 | 200 | 200 | 200 | 200 | 175 | 175 | 175 | 175 |
| Surf. Resistance$^{(2)}$, Rs (ohm) | $>2 \times 10^8$ | $8.0 \times 10^2$ | $6.2 \times 10^2$ | $3.3 \times 10^2$ | $3.3 \times 10^2$ | $>2 \times 10^8$ | $7.3 \times 10^3$ | $2.7 \times 10^3$ | $1.1 \times 10^3$ |
| Surf. Resistivity$^{(2)}$, ps (Ohm/sq) | $>2 \times 10^9$ | $1.0 \times 10^4$ | $7.7 \times 10^3$ | $4.1 \times 10^3$ | $4.1 \times 10^3$ | $>2 \times 10^9$ | $9.2 \times 10^4$ | $3.3 \times 10^4$ | $1.3 \times 10^4$ |

$^{(1)}$as measured on extruded sheet according to ASTM D257-07
$^{(2)}$as measured on thermally treated sheet according to ASTM D257-07

Example 4: Preparation of the Article by Injection

The blend B6 is then injected to form 25×25 mm square (11) having a thickness of 1 mm. Injection was done on DR Boy 22A injection press having screw diameter of 18 mm, with a ratio length to diameter L/D of 20 at a barrel temperature of 260° C., a mold temperature of 30° C. and a screw speed of 25 mm/s.

The conditions of process and their results on the electrical properties of the articles are given in table 7.

TABLE 7

| Injection process conditions | |
|---|---|
| Injection trial | I1 |
| Composition | B6 |
| Surface resistance[1], $R_S$ (ohm) before injection | $3.9 \times 10^1$ |
| Surface resistivity[1], $\rho_S$ (Ohm/sq) before injection | $4.9 \times 10^2$ |
| Barrel temperature (° C.) | 260 |
| Mold temperature (° C.) | 30 |
| Injection speed (mm/s) | 25 |
| Hold pressure (bar) | 39 |
| Surface resistance[2], $R_S$ (ohm) | / |
| Surface resistivity[2], $\rho_S$ (Ohm/sq) | / |
| Surface resistance[3], $R_S$ (ohm) | $2.0 \times 10^{10}$ |
| Surface resistivity[3], $\rho_S$ (Ohm/sq) | $2.0 \times 10^{11}$ |
| Volume resistance[3], $R_V$ (ohm) | $3.1 \times 10^{11}$ |
| Volume resistivity[3], $\rho_V$ (ohm · cm) | $2.2 \times 10^{13}$ |

[1] as measured on compression molded plaque from pellets according to IEC 61340-2-3: 2000
[2] as measured on injected specimen according to ASTM D257-07
[3] as measured on injected specimen according to IEC 61340-2-3: 2000

Example 5: Thermal Switch Effect on the Injected Article

The resistivity of the injected specimen was measured after it was cool to ambient temperature and conditioned. The heating conditions and the results on the electrical properties are given in table 8.

TABLE 8

| heating conditions | |
|---|---|
| Heating trial | T11 |
| Injected specimen | I1 |
| Composition | B6 |
| Surf. resistance[1], $R^S$ of the specimen before heating (ohm) | $2.0 \times 10^{10}$ |
| Oven temperature (° C.) | 240 |
| Heating time (min) | 30 |
| Surface resistance[2], $R_S$ (ohm) | $1.9 \times 10^2$ |
| Surface resistivity[2], $\rho_S$ (Ohm/sq) | $2.4 \times 10^3$ |
| Surface resistance[3], $R_S$ (ohm) | / |
| Surface resistivity[3], $\rho_S$ (Ohm/sq) | / |
| Volume resistance[3], $R_V$ (ohm) | $<1 \times 10^3$ |
| Volume resistivity[3], $\rho_V$ (ohm · cm) | $<7 \times 10^4$ |

[1] as measured on injected specimen according to ASTM D257-07
[2] as measured on thermally treated injected specimen according to ASTM D257-07
[3] as measured on thermally treated injected specimen according to IEC 61340-2-3: 2000

The invention claimed is:

1. An article suitable to act as a thermal switch device, the article having a surface resistance of more than $10^5$ ohms as determined according to ASTM D257-07, and being formed from a polymer composition, said polymer composition comprising
   from 50 to 99.9 wt % relative to the total weight of the polymer composition, of a polymer being selected from an amorphous polymer having a glass transition temperature Tg, a semi-crystalline polymer having a melting temperature Tm or a mixture thereof, and
   from 0.1 to 50 wt % relative to the total weight of the polymer composition, of a conductive material;
   wherein the surface resistance of the article is divided by at least 10, when said article is submitted for a determined period of time of less than 5 minutes to a temperature switch
   i) ranging from Tg+10° C. to Tg+250° C. if the polymer composition comprises an amorphous polymer,
   ii) ranging from Tm−80° C. to Tm+250° C. if the polymer composition comprises a semi-crystalline polymer,
   iii) ranging from Tg+10° C. to Tg+250° C. if the polymer composition comprises a mixture of amorphous and semi-crystalline polymers and the amorphous polymer forming the continuous polymeric phase, or
   iv) ranging from Tm−80° C. to Tm+250° C. if the polymer composition comprises a mixture of amorphous and semi-crystalline polymers and the semi-crystalline polymer forming the continuous polymeric phase.

2. The article according to claim 1, wherein the conductive material of the polymer composition is selected from the group consisting of carbon nanotubes, carbon nanofibers, carbon black, metal fibers, metal powders and blends thereof.

3. The article according to claim 1, wherein the polymer composition comprises an amorphous polymer, wherein the amorphous polymer is selected from polystyrene (PS), atactic polypropylene (aPP), acrylonitrile-butadiene-styrene (ABS), polycarbonate (PC), styrene acrylonitrile (SAN), poly(methyl methacrylate) (PMMA), poly(vinyl chloride) (PVC), polybutadiene (PBu), polybutylene terephthalate (PBt), poly(p-phenylene oxide) (PPO), polysulfone (PSU), polyethersulfone (PES), polyethylenimine (PEI), polyphenylsulfone (PPSU), acrylonitrile styrene acrylate (ASA) or any combination thereof.

4. The article according to claim 1, wherein the polymer composition comprises an semi-crystalline polymer, and wherein the semi-crystalline polymer is selected from polyamide, homo- and co-polymer of ethylene (PE), homo- and co-polymer of propylene (PP), impact copolymer of propylene (IPP), Polylactide (PLA), polyether ether ketone (PEEK), polyoxymethylene (POM), syndiotactic polystyrene (sPS), polyphenylene sulfide (PPS), liquid crystalline polymers (LCP), homo- and co-polymer of butane, homo- and co-polymer of hexene, ethylene vinyl acetate (EVA), polyurethane or any combination thereof.

5. The article according to claim 1, wherein the surface resistance of the article is divided by at least 10, when said article is submitted for a determined period of time of less than 5 minutes to temperature switch
   i) ranging from Tg+75° C. to Tg+250° C. if the polymer composition comprises an amorphous polymer.

6. The article according to claim 5 wherein the surface resistance of the article is divided by at least 10, when said article is submitted for less than 2 minutes to the temperature switch.

7. The article according to claim 1, wherein the polymer composition comprises at least 0.5 wt % relative to the total weight of the polymer composition, of the conductive material.

8. The article according to claim 1 having a thermal conductivity higher than 0.4 W/(m*K).

9. The article according to claim 1, wherein the article is a film, a sheet, a formed sheet, a pipe or an injected article.

10. A process to produce an article suitable to act as a thermal switch device according to claim 1, comprising the step of:
 a) providing a polymer composition having a surface resistance of less than $10^4$ ohms, said polymer composition comprising:
 from 50 to 99.9 wt % relative to the total weight of the polymer composition, of a polymer being selected from an amorphous polymer having a glass transition temperature Tg, a semi-crystalline polymer having a melting temperature Tm or a mixture thereof, and
 from 0.1 to 50 wt % relative to the total weight of the polymer composition, of a conductive material;
 b) forming or pre-forming an article; and
 c) cooling the article by contact with a cooling device system or medium using a temperature of at least Tg−20° C. if the polymer composition comprises an amorphous polymer or at least Tm−20° C. if the polymer composition comprises a semi-crystalline polymer.

11. A process according to claim 10, wherein the step b) of forming or performing the article is made by extrusion or injection.

12. A process according to claim 10, wherein the step c) comprises cooling the article by a cooling device system using a temperature ranging from Tg−20° C. to Tg−150° C. if the polymer composition comprises an amorphous polymer, ranging from Tm−20° C. to Tm−150° C. if the polymer composition comprises a semi-crystalline polymer, ranging from Tg+10° C. to Tg+250° C. if the polymer composition comprises a mixture of amorphous and semi-crystalline polymers and the amorphous polymer forming the continuous polymeric phase, or ranging from Tm−80° C. to Tm+250° C. if the polymer composition comprises a mixture of amorphous and semi-crystalline polymers and the semi-crystalline polymer forming the continuous polymeric phase.

13. A process according to claim 10, the process comprising a step b) of pre-forming the article resulting in a pre-formed article wherein the process further comprises after step c), a step d) of forming the article from the preformed article at a temperature less than Tg when the polymer composition comprises an amorphous polymer, less than Tm when the polymer composition comprises a semi-crystalline polymer, at a temperature less than Tg when the polymer composition comprises a mixture of amorphous and semi-crystalline polymers and the amorphous polymer forming a continuos polymeric phase, or at a temperature less than Tm when the polymer composition comprises a mixture of amorphous and semi-crystalline polymers and the semi-crystalline polymer forming the continuous polymeric phase.

* * * * *